A. C. KUBICEK.
CORN PLANTER ATTACHMENT.
APPLICATION FILED SEPT. 2, 1921.

1,425,867.

Patented Aug. 15, 1922.

INVENTOR
A.C. KUBICEK.
BY HIS ATTORNEY.
James F. Williamson

UNITED STATES PATENT OFFICE.

ANTON C. KUBICEK, OF BLOOMING PRAIRIE, MINNESOTA.

CORN-PLANTER ATTACHMENT.

1,425,867.　　　　　Specification of Letters Patent.　Patented Aug. 15, 1922.

Application filed September 2, 1921. Serial No. 497,934.

*To all whom it may concern:*

Be it known that I, ANTON C. KUBICEK, a citizen of the United States, residing at Blooming Prairie, in the county of Steele and State of Minnesota, have invented certain new and useful Improvements in Corn-Planter Attachments; and I do hereby declare the following to be a full, clear, and exact description of the invention, such as will enable others skilled in the art to which it appertains to make and use the same.

This invention relates to an agricultural machine adapted to be supported for movement over the ground and particularly to a machine for working in soft or plowed ground, and constitutes a stabilizing or rudder device applied to such a machine to hold the same on a determined course. The device is especially designed for use when such machine is traveling along a hillside or inclined surface.

It is an object of this invention to combine with such a machine a flat blade constituting a rudder device rigidly supported from said machine and disposed at some distance from the rear end thereof.

It is a further object of the invention to so support such a device that the same can be readily moved to and held in inoperative position.

Figure 1:
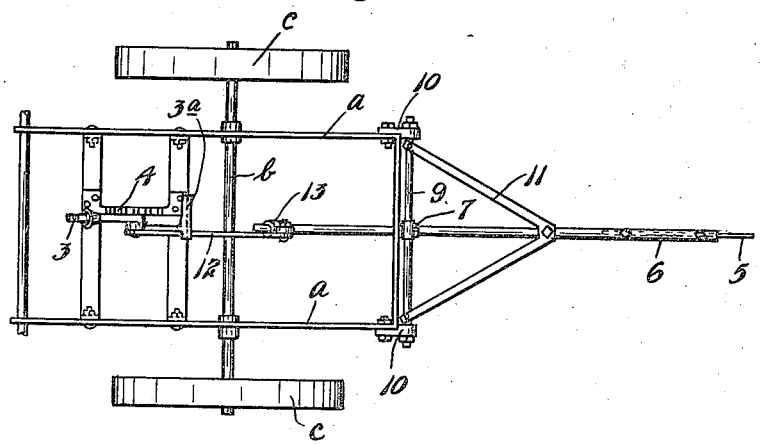
Figure 2:
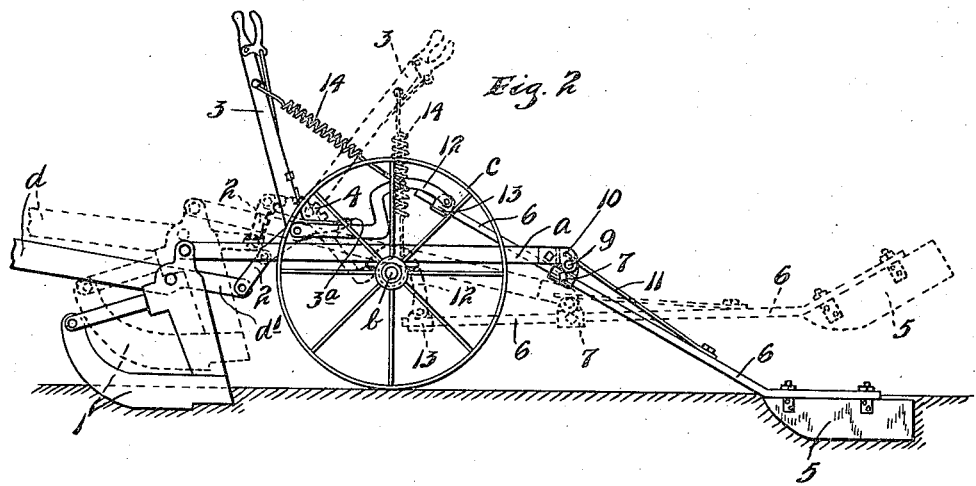

These and other objects and advantages of the invention will be apparent from the following description made in connection with the accompanying drawings in which like reference characters refer to the same parts throughout the different views and in which, Fig. 1 is a plan view of the device; and Fig. 2 is a view in side elevation thereof.

Referring to the drawings, an agricultural machine is disclosed which, in the illustrated embodiment, comprises one type of corn planter having longitudinal frame members *a* connected by transverse members and comprising the axle *b* supported on the wheel *c*. The machine is adapted to be propelled or drawn by a tractor means connected to the usual tongue member *d*. The machine comprises the usual shoes 1 which are bolted to a transverse member extending from the tongue *d*. The tongue *d* has an extension *d'* projecting therefrom which is connected by a link member 2 to the downwardly extending end of a bell crank lever having an upstanding handle portion 3. The lever is pivoted to swing adjacent the usual toothed locking quadrant 4 supported on the frame of the machine and is equipped with the usual operated pawl for engaging in said quadrant. When the lever is swung rearwardly to the position shown in dotted lines in Fig. 2, the rear end of the tongue will be raised together with the shoes 1, the frame members *a* pivoting about the axle *b* so that the shoes are raised from contact with the ground.

In accordance with the present invention, a rudder or stabilizing device is provided comprising a blade member 5 adapted to travel below the surface of the ground and disposed in the plane of travel of the machine.

The shoe 5 is supported by a downwardly extending rod 6 to which is rigidly secured a supporting collar or member 7 having an upstanding lug rigidly secured to a rod 9, which rod is pivoted at its ends in bearing members 10 bolted to the rear ends of side members *a*, the rod being provided with nuts at its ends to prevent longitudinal movement thereof. Suitable bracing members 11 are secured adjacent the ends of rod 9 and also rigidly bolted to the supporting member 6. A member 12 has a forwardly projecting straight portion secured to the frame by the same bolt as the lever 3 and also has an upwardly extending and rearwardly curved portion, the end of which is pivoted to a collar or sleeve member 13 adapted to slide on the front end of the member 6. A spring member 14 is connected to the lever 3 and to the member 12, as shown.

The lever 3 is provided with a foot pedal 3ª extending rearwardly therefrom which pedal has a portion at one side extending over the straight portion of member 12. To raise the member 5 from the ground in turning corners and at other times, the lever 3 is swung by the foot pedal 3ª and the member 12 thus depressed, the member 6 moved down and the shoe 5 thus raised from the ground, as indicated in Fig. 2. When the lever is swung rearwardly, by the handle, the extension of the foot pedal will also contact with the member 12 and raise the shoe 5 from the ground. It will be understood that when the member 12 is thus depressed, the sleeve 13 slides along the rod 6 and, as stated, depresses the front end thereof. The lever can, of course, be locked in any desired position by means of the quadrant 4.

If the machine is traveling transversely along an inclined surface, such as a hillside, there is a great tendency for the wheels to slip or slide down hill. This is objectionable in most agricultural machines and especially in a planting machine, as it is desired to have the rows straight and parallel. To prevent such lateral slipping or sliding motion the shoe 5 is engaged with the ground and acts as a rudder to stabilize the machine and prevent the side slipping of the wheels.

From the above description it is seen that applicant has provided an extremely simple and efficient means for preventing what has been a very objectionable feature in farm implements when the same were operated on sloping ground.

The device comprises few parts and can be inexpensively made and applied to practically all standard types of machines.

It will, of course, be understood that various changes may be made in the form, details and arrangement of the device without departing from the scope of applicant's invention, which, generally stated, consists in the matter shown and described and set forth in the appended claims.

What is claimed is:

1. The combination with a corn planter and the usual ground engaging shoes thereof, pivoted means for supporting said shoes whereby they can be raised, a flat rudder blade pivotally disposed at one end of the machine, a pivot support for the same, and a single means for simultaneously raising said shoes and said rudder blade.

2. The combination with a corn planter, and the wheeled frame thereof, of a vertical blade disposed at some distance from the wheels and adapted to travel in the ground and disposed in a plane parallel to the direction of travel of the machine, a rod for supporting said shoe, means pivoted on the frame for supporting said rod, a sleeve slidable on the end of said rod, and a lever rigidly connected to said sleeve whereby when the lever is swung the blade will be raised to an inoperative position.

In testimony whereof I affix my signature.

ANTON C. KUBICEK.

Witnesses:
F. W. SAWYER,
L. GAHOGAN.